Figure 1:
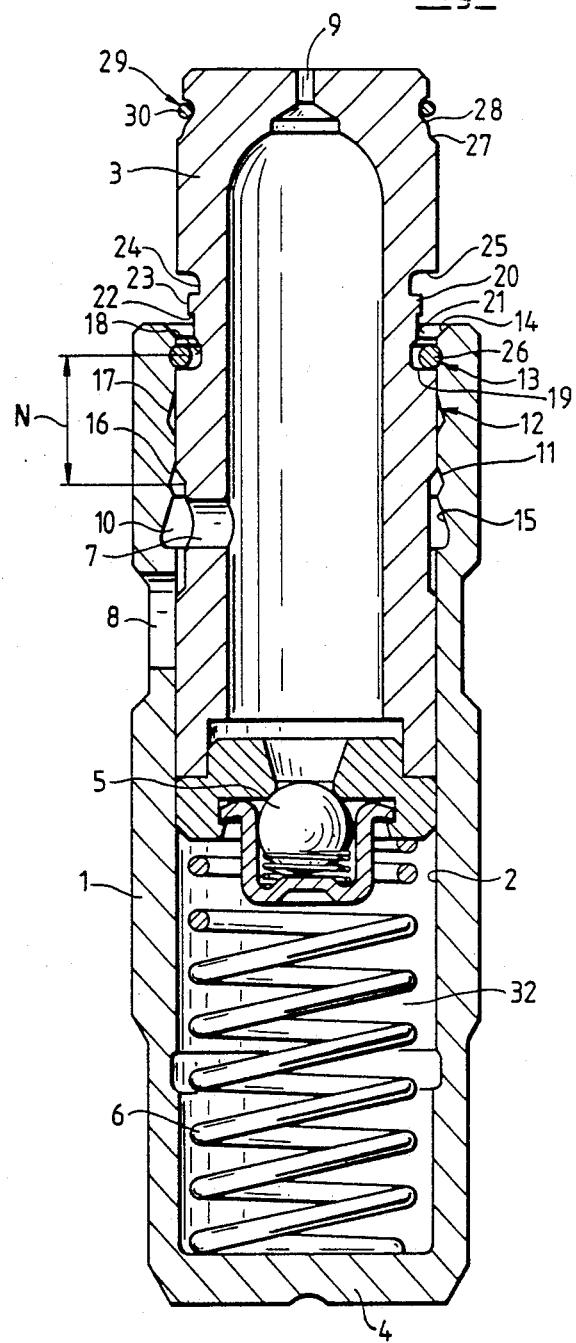

United States Patent [19]

Goppelt et al.

[11] Patent Number: 4,792,322
[45] Date of Patent: Dec. 20, 1988

[54] CHAIN TIGHTENER

[75] Inventors: Dieter Goppelt, Munchaurach; Dieter Schmidt, Nurnberg, both of Fed. Rep. of Germany

[73] Assignee: INA Walzlager Schaeffler KG, Fed. Rep. of Germany

[21] Appl. No.: 109,284

[22] Filed: Oct. 15, 1987

[30] Foreign Application Priority Data

Oct. 30, 1986 [DE] Fed. Rep. of Germany ....... 3636919

[51] Int. Cl.$^4$ ............................................. F16H 7/12
[52] U.S. Cl. ..................................... 474/136; 474/138
[58] Field of Search ............... 474/101, 109, 110, 111, 474/136, 138; 180/217, 231; 280/267; 267/217; 188/321.11, 322.19

[56] References Cited

U.S. PATENT DOCUMENTS 3,626,776 12/1971 Staudinger et al. ................. 474/111
4,539,001 9/1985 Okabe ................................. 474/138

Primary Examiner—Thuy M. Bui
Attorney, Agent, or Firm—Bierman & Muserlian

[57] ABSTRACT

A chain tightener with a dampening piston guided in a housing and axially acted upon by a spring in the chain tightening direction, and a radially resilient stop ring which cooperates with recesses of the housing and the dampening piston and limits its stroke while allowing a return movement of the dampening direction opposite to the chain tightening direction, wherein the housing (1) has a receiving groove (10) and the dampening piston (3) has an insert edge (25) for the stop ring (26) wherein during sliding of the dampening piston (3) into the housing (1) the insert edge (25) shifts the stop ring (26) until the latter radially snaps into the receiving groove (10), that a locking groove (18) for the stop ring (26) is provided at the dampening piston (3) which is defined on the one hand by a stop end face (19) and on the other hand by a stop ramp (20) wherein the stop ramp (20) fits under the stop ring (26) snapped in the receiving groove (10), that the stop end face (19) shifts the stop ring (26) under the action of the spring (6) out of the receiving groove (10) into an index notch (11) of the housing (1) and that at the end of a return stroke (H), the stop ring (26) disposed in the index notch (11) abuts against the stop ramp (20).

18 Claims, 2 Drawing Sheets

CHAIN TIGHTENER

STATE OF THE ART

Chain tighteners with a dampening piston guided in a housing and axially acted upon by a spring mean in the chain tightening direction and a radially resilient stop ring which cooperates with recesses of the housing and the dampening piston and limits its stroke while allowing a return movement of the dampening direction opposite to the chain tightening direction are used for example in a drive chain of camshafts of an internal combustion engine as described in DE-OS No. 1,650,620. In the chain tightener of DE-OS No. 1,650,620, a cap nut is sealingly attached to the housing for mounting the dampening piston and supports the dampening piston via a pressure spring. However, during assembling of the chain tightener, the stop ring does not necessarily reach the correct initial position. The assembly of the chain tightener and its installation relative to the chain is also problematic.

OBJECTS OF THE INVENTION

It is an object of the invention to provide a novel chain tightener whose assembly is simplified so that the dampening piston and the stop ring are insertable from the open side of the housing at which the dampening piston acts on the chain and that the stop ring reaches the correct initial position between the housing and the dampening piston during insertion of the piston.

This and other objects and advantages of the invention will become obvious from the following detailed description.

THE INVENTION

The chain tightener of the invention with a dampening piston guided in a housing and axially acted upon by a spring means in the chain tightening direction, and a radially resilient stop ring which cooperates with recesses of the housing and the dampening piston and limits its stroke while allowing a return movement of the dampening direction opposite to the chain tightening direction, is characterized in that the housing (1) has a receiving groove (10) and the dampening piston (3) has an insert edge (25) for the stop ring (26) wherein during sliding of the dampening piston (3) into the housing (1) the insert edge (25) shifts the stop ring (26) until the latter radially snaps into the receiving groove (10), that a locking groove (18) for the stop ring (26) is provided at the dampening piston (3) which is defined on the one hand by a stop end face (19) and on the other hand by a stop ramp (20) wherein the stop ramp (20) fits under the stop ring (26) snapped in the receiving groove (10), that the stop end face (19) shifts the stop ring (26) under the action of the spring means (6) out of the receiving groove (10) into an index notch (11) of the housing (1) and that at the end of a return stroke (H) the stop ring (26) disposed in the index notch (11) abuts agains the stop ramp (20).

This design makes it possible to insert the dampening piston and the stop ring into the housing from the open side of the housing at which the dampening piston acts on the chain. Thus, the housing may be made in one piece wherein a blind hole is sufficient for receiving the spring means and the dampening piston and the assembly of the chain tightener is simple. This is especially of advantage when the chain tightener is a hydraulic chain tightener with oil pressure acting upon the dampening piston.

During assembly of the chain tightener, the stop ring is inserted into the housing by means of the insert edge for the stop ring and resiliently expands radially within the receiving groove. The stop ramp of the piston is then pushed under the stop ring by the force of the spring means. Thereafter, the latter is shifted from the stop end face or the locking groove into the index notch and this position represents the initial position for the chain tightening range.

In case a sudden load is exerted from the chain onto the piston a return movement of the piston is obtained. In normal circumstances when the piston is under oil pressure, the return movement is attenuated and limited by the dampening rate of the oil pressure-piston system and the return movement ends before the stop ramp abuts against the stop ring (dampening stroke). In special cases in which the oil pressure has not yet been built up or does not exist any more and thus the chain is under load, the stop ramp abuts against the stop ring at the end of the return stroke and limits the return movement of the piston. For example, such a special case is obtained during a reversal of the circulating direction of the chain so that its return strand becomes the driving strand. This is the case in an engine of a motor vehicle for example when the vehicle is parked uphill in driving direction in forward speed or downhill in reverse The limitation of the return movement of the piston by the stop ring and the stop ramp provides that the piston does not return to such an extent that the chain skips over during a subsequent starting of the motor. The possible return stroke is greater than or equal to the dampening stroke with consideration of the temperature-dependent lengthening of the chain.

According to a preferred embodiment of the invention, the housing is provided with several index notches wherein the stop end face of the dampening piston shifts the stop ring under the action of the spring means during a lengthening of the chain into the respectively successive index notch whereby a wide chain tightening range is achieved. In each index notch, the stop ring acts in the same manner as a stop for the stop end face and the stop ramp of the locking groove of the piston. The possible return stroke is smaller than the distance of the index notches and over the entire chain tightening range, a uniform chain tension is attained.

According to a further modification of the invention, a mounting ring snaps into a groove of the dampening piston which groove is provided with a bevelled surface and a succeeding latch surface. The mounting ring is shifted onto the latch surface by the bevelled surface with a tool insertable in a gap between the housing and the dampening piston wherein the mounting ring engages in a notch of the housing and blocks a movement of the dampening piston relative to the housing. In the blocking position, the chain tightener can simply be mounted. If in operational position the dampening piston should act upon the chain, then the piston is manually pressed against the force of the spring means whereby the mounting ring snaps back from the latch surface into the groove. The blocking position is thus neutralized so that the stop ring is shifted into the first index notch by the force of the spring means.

Figure 2:
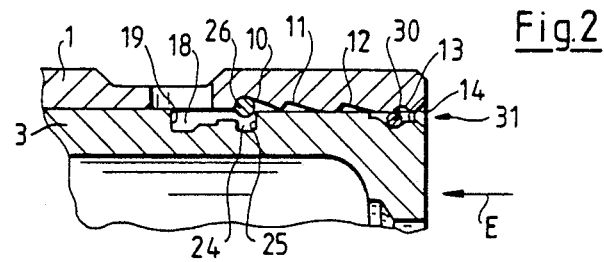
Figure 3:
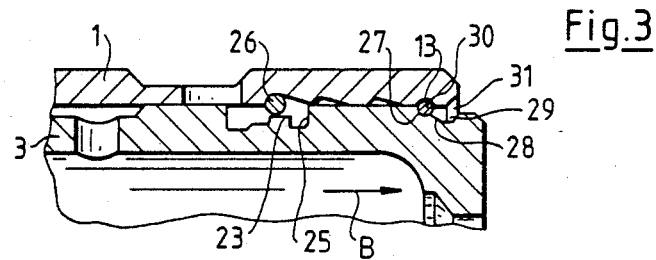
Figure 4:
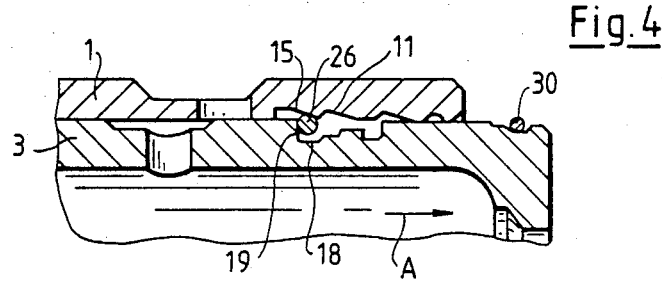
Figure 5:
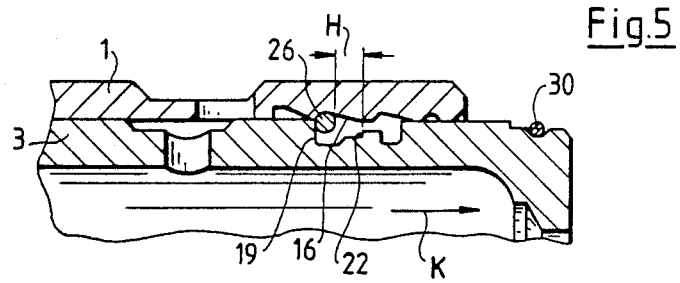
Figure 6:
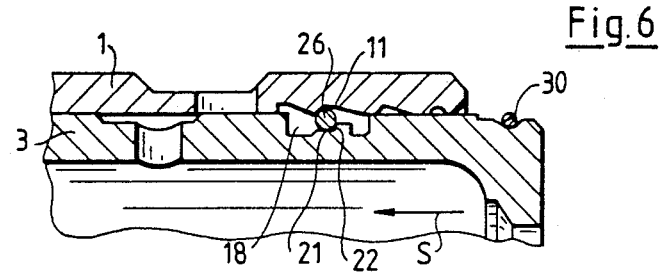

Referring now to the drawings:

FIG. 1 is a cross-sectional view of a chain tightener with the dampening piston in the outermost lock-in position and FIG. 2 is a partial view of the chain tightener with the dampening piston in the innermost stop position, FIG. 3 is a partial view of the chain tightener with the dampening piston blocked in mounting position, FIG. 4 is a partial view of the chain tightener with the dampening piston moving in the innermost lock-in position, FIG. 5 is a partial view of the chain tightener with the dampening piston in its innermost lock-in position and FIG. 6 is a partial view of the chain tightener with the chain exerting a shock load from its position of FIG. 5 onto the dampening piston.

FIGS. 2 to 6 are of smaller scale in comparison to FIG. 1.

A one-piece housing (1) is provided with an unilaterally open guide bore (2) and inserted therein is a hollow dampening piston (3). At the side of the dampening piston (3) facing the bottom (4) of the housing (1) is a check valve (5) and arranged between the bottom (4) and the check valve (5) is a pressure spring (6) acting upon the piston (3). Laterally provided at the piston (3) is an opening (7) which is in communication with an oil pressure port (8) of the housing (1) and an opening (9) at the top of the piston (3) is provided for ventilation.

Arranged adjacent to each other from inside toward the outside at the inner circumference of the housing (1) are a receiving groove (10), three or, if necessary, more corresponding index notches (11, 12, 13) and a bevelled entrance (14). The diameter of the receiving groove (10) is greater than the index notch (11) and the receiving groove (10) is provided with a bevelled surface (15) toward the index notch (11). The index notches (11, 12) are provided with corresponding bevelled surface (16, 17).

Arranged at the outer circumference of the piston (3) is a locking groove (18) which is defined on the one hand by a stop end face (19) and on the other hand by a stop ramp (20). The stop ramp (20) has a locking area (21), a stop edge (22) and a passing surface (23). Subsequent to the stop ramp (20) is a clamping groove (24) with an insert edge (25) and the outer diameter of the stop end face (19) and the insert edge (25) corresponds to the outer diameter of the piston (3). The diameter of the passing surface (23) is smaller and a resilient stop ring (26) cooperates with the mentioned circumferential grooves and notches of the housing (1) and the piston (3). At its outside, the piston (3) is provided with a groove (29) including a latch surface (27) and a bevelled surface (28) which cooperates with a mounting ring (30).

Assembling of the described chain tightener is attained in the following manner: After inserting the pressure spring (6) in the housing (1), the piston (3) is pushed in with the stop ring (26) located in its clamping groove (24). The mounting ring (30) is disposed in the groove (29) and resiliently bears against the groove base. During insertion of the piston (3), the stop ring (26) reaches the bevelled entrance (14) which presses the latter against its spring force into the clamping groove (24). Upon further pushing of the piston (3), the insert edge (25) presses the stop ring (26) below the index notches (13, 12, 11) until being disposed in the receiving groove (10). In the receiving groove (10), the stop ring (26) expands under the action of its spring force so as to bear against the base of the receiving groove (10). The depth of the receiving groove (10) is smaller than the cross-section of the stop ring (26) so that the stop ring (26) disposed in the receiving groove (10) defines the innermost stop for the manual insertion in direction of the arrow (E) (see FIG. 2) whereby the mounting ring (30) is located below the index notch (13).

Thereafter, by inserting a tool through the gap (31) between the piston (3) and the housing (1), the mounting ring (30) is retained in this position and the piston (3) is released. Under the action of the pressure spring (6), the piston (3) is then displaced in the direction of arrow (B) while the latch surface (27) slides via the bevelled surface (28) under the mounting ring (30) and pushes the latter against its spring force into the index notch (13). This represents the blocking position of the piston (3) (see FIG. 3). In the blocking position, the chain tightener is mounted to the aggregate, for example an engine whose chain is to be tightened. In this blocking position, the stop ring (26) is ineffective and is arranged over the passing surface (23).

After the assembly of the chain and possibly of a transmission element provided between the piston (3) and the chain, the dampening piston (3) is acted upon manually in direction of the arrow (B) so that the mounting ring (30) slides from the latch surface (27) under the action of its spring force via the bevelled surface (28) into the groove (29). This is not prevented by the stop ring (26) since its distance to the insert edge (25) is sufficiently large.

The piston (3) now moves in direction of the arrow (A) under the action of the pressure spring (6) in the chain tightening direction. The stop end face (19) thereby abuts against the stop ring (26) and pushes the latter via the bevelled surface (15) in the direction of the index notch (11) (see FIG. 4). The locking groove (18) is sufficiently deep so as to be prevented from obstructing the compression of the stop ring (26). The stop ring (26) then snaps in the first index notch (11). This position is the beginning of the chain tightening range. The chain is now tightened.

The mode of the operation is at follows: Through the oil pressure port (8) which in the present example is under motor oil pressure, a high pressure is built up in the housing (1) between the latter and the piston (3) within the space (32) by the check valve (5). Upon a sudden load of the chain, a force is exerted onto the piston (3) in the direction of the arrow (S) (see FIG. 6). This results in a return movement of the piston (3) against the direction of force of the pressure spring (6) and the return movement is attenuated by the oil pressure within space (32) of the housing (1). During the return movement, the locking area (21) is moved under the stop ring (26) disposed in the index notch (11) and prevents the compression of the stop ring (26) while guaranteeing that the stop ring (26) remains at the base of the index groove (11).

If the oil pressure within the space (32) is not sufficient to bring the piston (3) to a standstill upon a load, then the stop surface (22) abuts the stop ring (26). Consequently, the return movement of the piston (3) is limited in the direction of the arrow (S) and this maximal return stroke (H) is determined by the distance of the stop end face (19) from the stop surface (22) and the diameter of the circular cross-section of the stop ring (26). The maximal return stroke amounts to 2 mm, for example.

The limitation of the return stroke (H) prevents the chain from skipping teeth of its driven gears during sudden loads. In this context, it is also favorable that the stop ring (26) merely acts with regard to tightening and dampening of the chain as a stop and its spring characteristics serves only to urge it into the respectively suitable position. The limitation of the maximal return stroke (H) by the stop ring (26) is for example effective when shortly after starting the motor, insufficient oil pressure within space (32) has been built up yet, or when at shut down of the engine, the return strand which is acted upon by the chain tightener is loaded.

In case the chain lengthens during operation e.g. due to wear, then the piston (3) is further shifted by the action of the pressure spring (6) and the oil pressure within the space (32), respectively, in the direction of the arrow (K) (see FIG. 5) whereby its stop end face (19) displaces the stop ring (26) via the bevelled surface (16) of the index notch (11) into the next notch (12). The distance of the index notches (11, 12, 13) is greater than the maximal return stroke (H).

When the stop ring (26) reaches the index notch (12), then the above-stated defines the maximal return stroke (H). Finally, the stop ring (26) reaches the index notch (13) (see FIG. 1) and even in this outer-most lock-in position, the piston (3) can return only by the maximal return stroke (H). The effective stroke (N) of the piston (3) determining the chain adjusting range amount of 23 mm, for example.

Various modifications of the chain tightener of the invention may be made without departing from the spirit or scope thereof and it should be understood that the invention is intended to be limited only as defined in the appended claims.

What we claim is:

1. A chain tightener with a dampening piston guided in a housing and axially acted upon by a spring means in the chain tightening direction, and a radially resilient stop ring which cooperates with recesses of the housing and the dampening piston and limits its stroke while allowing a return movement of the dampening direction opposite to the chain tightening direction wherein the housing (1) has a receiving groove (10) and the dampening piston (3) has an insert edge (25) for the stop ring (26) wherein during the sliding of the dampening piston (3) into the housing (1), the insert edge (25) shifts the stop ring (26) until the latter radially snaps into the receiving groove (10), a locking groove (18) for the stop ring (26) is provided at the dampening piston (3) which is defined by a stop end face (19) and by a stop ramp (20) wherein the stop ramp (20) fits under the stop ring (26) snapped in the receiving groove (10), the stop end face (19) shifts the stop ring (26) under the action of the spring means (6) out of the receiving groove (10) into an index notch (11) of the housing (1) and at the end of a return stroke (H), the stop ring (26) disposed in the index notch (11) abuts against the stop ramp (20).

2. A chain tightener of claim 1 wherein the housing (1) is provided with several index notches (11, 12, 13) whereby the stop end face (19) of the dampening piston (3) shifts the stop ring (26) into the respectively successive index notch (12, 13) under the action of the spring means (6) during a lenghtening of the chain.

3. A chain tightener of claim 1 wherein the stop ring (26) disposed in the receiving groove (10) defines an end stop for the insert edge (25).

4. A chain tightener of claim 1 wherein the depth of the receiving groove (10) is smaller than the cross-section of the stop ring (26).

5. A chain tightener of claim 1 wherein the depth of the receiving groove (10) is greater than the depth of the index notch (11, 12, 13).

6. A chain tightener of claim 1 wherein the resilient stop ring (26) has a circular cross-section.

7. A chain tightener of claim 1 wherein an insert groove (24) is defined between the stop ramp (20) and the insert edge (25) for receiving the stop ring (26) during insertion of the dampening piston (3).

8. A chain tightener of claim 1 wherein a bevelled entrance is formed at the opening of the housing (1) for pushing the stop ring (26) into the clamping groove (24) during insertion of the dampening piston (3).

9. A chain tightener of claim 1 wherein the stop ramp (20) includes a lock surface (21), a stop edge (22) and a passing surface (23) for the stop ring (26) wherein the diameter of the passing surface (23) is greater than that of the lock surface (21) and the latter prevents a compression of the stop ring (26) when being disposed in one of the index notches (11, 12, 13), and the passing surface (23) passes through under the stop ring (23) when the latter is disposed in the receiving groove (10).

10. A chain tightener of claim 1 wherein the locking-groove (18) is designed between the stop end face (19) and the stop ramp (20) so that it receives the stop ring (26) during shifting from the receiving groove (10) to the index notch or index notches (11, 12, 13).

11. A chain tightener of claim 1 wherein a mounting ring (30) snaps into a groove (29) of the dampening piston (3) which groove (29) is provided with a bevelled surface (28) and a succeeding latch surface (27) an the mounting ring (30) is shiftable onto the latch surface (27) by the bevelled surface (28) with a tool insertable in a gap (31) between the housing (1) and the dampening piston (3) wherein the mounting ring (30) engages in a notch of the housing (1) and blocks a movement of the dampening piston (3) relative to the housing (1).

12. A chain tightener of claim 11 wherein the notch is one of the notches (13) provided for the stop ring (26).

13. A chain tightener of claim 11 wherein the stop ring (26) is disposed in the receiving groove (10) in blocking position of the mounting ring (30).

14. A chain tightener of claim 13 wherein approximately the same distance is defined in the blocking position between the mounting ring (30) and the groove (29) as between the stop ring (26) and the insert (25) so that the blocking position is releasable through pressure onto the dampening piston (3) in opposition to the direction of force of the spring means (6).

15. A chain tightener of claim 14 wherein the dampening piston(3) is provided at its end guided in the housing (1) with a check valve (5) and a its circumference with an oil pressure port so that an oil pressure can be built up in the space (32) of the housing (1) behind the dappening piston (3).

16. A chain tightener of claim 15 wherein the spring means is a pressure spring (6) arranged within the space (32).

17. A chain tightener of claim 1 wherein the maximal return stroke (H) between the stop ring (26) and the stop surface (22) of the stop ramp (20) is greater than or equal to the dampening stroke of the dampening piston (3) attainable through the oil pressure.

18. A chain tightener of claim 1 wherein the maximal return stroke (H) is smaller than the distance between two of the index notches (11, 12, 13).

* * * * *